2,894,601

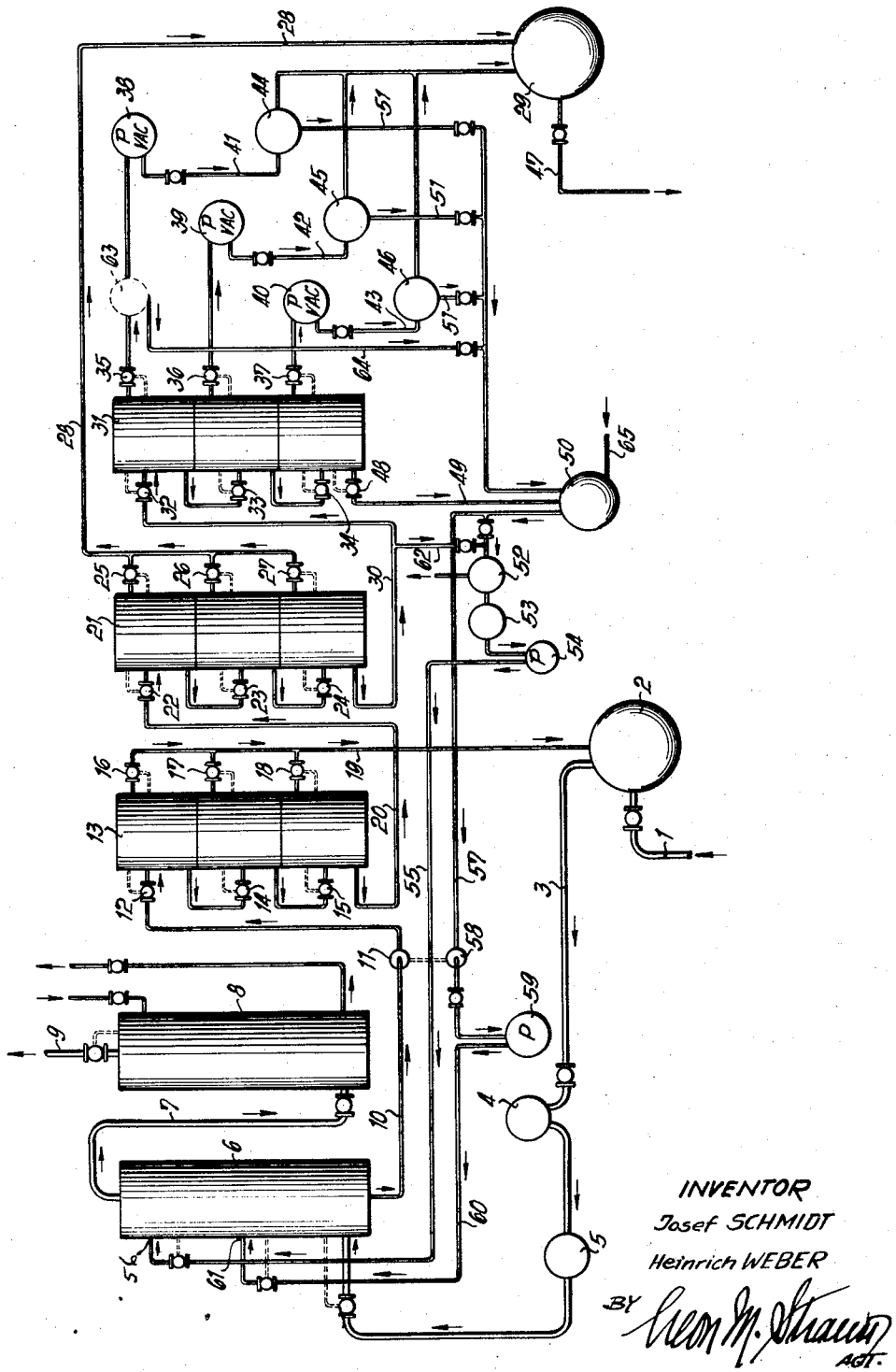

PROCESS FOR RECOVERING LOW BOILING POINT HYDROCARBONS

Josef Schmidt and Heinrich Weber, Recklinghausen, Westphalia, Germany, assignors to Firma Carl Still, Westphalia, Germany Application December 22, 1955, Serial No. 554,814

Claims priority, application Germany December 23, 1954

1 Claim. (Cl. 183—114.6)

This invention relates to a process for recovering low boiling point hydrocarbons which are gaseous at ordinary temperatures.

It is an object of the present invention to provide means facilitating recovery of low boiling point hydrocarbons through a novel and highly efficacious procedure which is easily carried out and results in considerably larger yields of the desired hydrocarbons than have heretofore been obtained with known procedures.

It is another object of the present invention to provide means contributing to a greatly improved and highly efficient process for recovering desired hydrocarbons from a crude gas mixture containing the same in conjunction with other undesired gaseous products, which process requires a minimum of power input and expenditure of energy, thereby rendering the entire process extremely economical.

Still another object of the present invention is to provide means contributing to an advantageous and economical process of the aforementioned type wherein stepwise reductions of a high pressure to which a mixture of gases including an absorption medium as well as the desired hydrocarbons is initially subjected is employed to effect separation of the hydrocarbons from the absorption medium.

More particularly, the present invention contemplates recovery from coke oven gas and like crude gas mixtures of $C_2$- and $C_3$-hydrocarbons, by way of example, through absorption thereof from gas mixtures containing the same by means of a fluid absorption material under high pressure, separation of the desired hydrocarbons in substantially pure form from the absorption medium being effected through pressure decreases carried out in a plurality of steps. The most important of the useful hydrocarbons to be recovered are, in this case, the $C_2$-hydrocarbons, especially ethylene and ethane, and of the $C_3$-hydrocarbons especially propene.

It is well known that in the initial gas mixture under consideration low boiling point hydrocarbons with different boiling points are practically always present at the same time, and that the initial gas mixture also includes other more volatile hydrocarbons having still lower boiling points, such as methane, and besides the latter also ballast gases such as nitrogen, hydrogen, carbon dioxide, carbon monoxide and other permanent gases.

According to the invention, therefore, and as could be expected from a consideration of known absorption phenomena, these other, more volatile hydrocarbons are also separated from the absorption medium together with the desired hydrocarbons the recovery of which is the primary purpose of the process disclosed more fully hereinafter. In other words, during recovery of $C_2$-hydrocarbons, the more volatile methane, for example, is also recovered.

In any event, consequently, the gas mixtures separated from the absorption medium by means of the pressure decreases or reductions referred to above contain, apart from the directly desired hydrocarbons, e.g. the $C_2$-hydrocarbons, also other more volatile gas constituents.

It is within the contemplation of the present invention, in processes of the above defined class for separating absorbed hydrocarbons from an absorption medium, not only to make use of pressure reductions effected in a series of sequential steps, but also to provide a special manner of carrying out such stepwise pressure decreasing.

Accordingly, the pressure to which the charged absorption medium is first subjected in a first expansion or pressure reduction stage is reduced only to such a value that a mixture is produced which contains the hydrocarbons desired to be recovered only in limited quantities and concentration and which consists preponderantly of undesired accompanying substances or impurities having high vapor pressures and of relatively permanent or stable nature.

The expansion products constituting this mixture formed in the first stage are either returned to the initial crude gas mixture or are otherwise used. In furtherance of the invention, the remaining mixture of the absorption medium and the gases absorbed therein formed in the first stage are brought in a further stage or step to such a reduced pressure that solely through the use of their natural pressure gradient these gases reach a gas container into which the expanded gases of a further, subsequently arranged expansion stage are fed by means of one or more pumps.

The mass of expanded gases in said gas container is then divided or separated in a known manner through fractional distillation into the individual pure gas fractions. Through this subdivision of the process it becomes possible, in contradistinction to processes employing only direct decrease of pressure to the ultimate end value, not only that the proportion of the absorption medium recovered for reuse is increased but also, by virtue of the removal of the released gases from the second expansion stage by means of their natural pressure gradient, that the load on the pumps for the last evaporation stage is quite considerably reduced.

The various expansion stages are each divided into a plurality of pressure decreasing sub-stages, which also has the advantage of increasing the proportion of the absorption medium to be recovered and of increasing the saving of energy required for the pumps.

The absorption medium from which the hydrocarbons are freed is then, together with the initial absorption medium, returned to the first expansion stage, which is constituted by an absorption column, after being subjected to an increase in pressure and is thereby again used in and circulated through the absorption column and the subsequent expansion stages.

Further, in accordance with another characteristic of the invention there may be connected to the suction side of each of the pumps an intense or deep cooling arrangement for the gas mixtures to be drawn by the pumps from the last expansion stage. This is doubly advantageous, first in that the volume of gas drawn by the pumps is decreased according to the temperature drop, and second in that a predetermined amount of the gaseous absorption medium is precipitated in liquid form, whereby the quantity of gas to be moved by the pumps is even further reduced.

Finally, in accordance with a further characteristic of the invention, a part of the absorption medium is branched off from the last or from a preceding expansion or pressure drop stage, liberated by means of expelling procedures, of impurities, such as hydrogen sulphide, organic sulphur compounds and the like, and returned to the head of the absorption column after being cooled and subjected to a higher pressure. Concurrently, the remaining non-liberated part of the absorption medium is returned to the absorption column on a floor or base located below the head.

The process according to the invention is hereinafter more fully explained in conjunction with the accompanying drawing which shows a schematic view of an arrangement suited for carrying out said process.

The initial or starting gas mixture which, after being cleaned or freed of tar and/or ammonia, is to be subjected to the process according to the invention and which still contains benzene products, for example, coke oven gas, is introduced into an accumulator or collector vessel or chamber 2 through a conduit 1, and is led from the collector chamber through a conduit 3 and a compressor 4 to a cooling device 5 connected to the outlet or pressure side of the compressor.

The mixture leaves the cooling device 5 at a pressure of approximately 20 atm. and a temperature of 20 to 50° C. and is introduced into the lower part of an absorption column 6. In this column the useful hydrocarbons, the undesired ballast substances and impurities, for example hydrogen sulphide, organic sulphur compounds, permanent ballast gases such as nitrogen and the like, are absorbed from the initial gas mixture by means of a suitable absorption medium, such as benzene or toluene, which is introduced into the column through conduits terminating at 56 and 61, respectively.

The remaining gases of the mixture are fed to a washing or scrubbing tower or column 8 through a conduit 7, in which tower they are liberated by means of a sufficiently high boiling washing medium from the relatively low boiling vaporous absorption medium which was combined with the gas in the preceding absorption column 6. From the tower 8 the residual gas is led through a conduit 9 to any suitable gas consumption device (not shown).

The charged absorption medium which, still under a pressure of 20 atm., is drawn from the base of the column 6 through a conduit 10 is allowed to expand through a suitable arrangement 11, such as a work-performing turbine, and through a fixed throttling member 12 into an expansion column 13. As may be seen from the drawing, the pressure reduction, i.e., expansion, in this column takes place in three pressure drop stages until an end pressure of 3 atm. is attained. This occurs by means of further expansion means 14 and 15.

Concurrently, expanded portions of the gaseous absorption medium are conducted through regulator means 16, 17 and 18 and a conduit 19 from the individual pressure drop stages back into the collector vessel 2 by virtue of their natural pressure gradient, the returned gases thus being mixed in the collector with the starting gas mixture fed into the latter from the conduit 1.

The remainder of the mixture of absorption medium and the substances absorbed thereby still left in the bottom of the column 13 is transferred through a conduit 20 and a throttling member 22 into a first pressure drop stage of an expansion or pressure reducing column or stage 21, and the pressure of the mixture is reduced in two further pressure drop stages to which the mixture fed via throttles 23 and 24 to an end value of, for example, 1.2 atm. At the same time, the liberated vapors and gases are transferred from the individual pressure drop stages through regulators 25, 26 and 27 and a conduit 28 to a gas container or receiver 29, transfer being effected solely through the natural pressure gradient of the gases.

The fluid, partially regenerated absorption medium which is collected on the bottom of the last pressure drop stage of the column 21 is led through a conduit 30 to a first pressure drop stage of a final expansion column or stage 31 and to two further pressure drop stages via throttling members 32, 33 and 34, respectively, the gases and vapors liberated in these stages being conducted through regulators 35, 36 and 37 to vacuum or suction pumps 38, 39 and 40.

From the pumps 38 to 40 these gases and vapors are led through conduits 41, 42 and 43 and cooling devices 44, 45 and 46, respectively, into the gas container or receiver 29, from which the gases are conducted through a conduit 47 to a fractional distillation plant (not shown) for further splitting up into the individual and pure fractions. The residual regenerated absorption medium falling to the bottom of the last pressure drop stage of the expansion stage 31 is led through a regulator 48 and a conduit 49 into a collector vessel 50, into which are also fed via conduits 51 the absorption medium separated from the gas and vapor mixtures in the coolers 44, 45 and 46.

A part, possibly 40%, of the recovered absorption medium collected in the vessel 50 is liberated from the impurities contained therein, such as $H_2S$ and the like, in a suitable expeller or separator device 52 and is thereafter cooled in a cooling arrangement 53 and returned through a conduit 55 by means of a pump 54 to the head of the absorption column 6, the medium entering the column at 56.

The remaining portion of the absorption medium flows from the vessel 50 through a conduit 57 to a pump 58 which is driven by the turbine 11. The turbine 11 thus makes it possible to use some of the energy liberated by the expansion of the gases for compressing the returning absorption medium, whereby the energy requirements of the complete system employed in carrying out the process according to the invention are very favorably influenced, i.e., decreased.

A supplementary or booster pump 59 is connected to the discharge side of the pump 58 to increase the pressure of the absorption medium to the required high value, say 21 atm., and the absorption medium thereafter reaches a portion of the absorption column 6 below the head thereof at 61 via a conduit 60. This portion of the medium entering the column 6 at 61 may, due to its lower entry location, be purified to a lesser extent than the portion of the absorption medium entering the head of the column 6 at 56.

Additionally, there is provided a line 62 branching off from the conduit 30 connected to the expansion stage 21 in order to remove some of the still to be purified absorption medium before it reaches the last expansion stage 31, i.e., after reduction of the pressure thereof to approximately 1.2 atm. The branched off portion of the medium is then liberated from the impurities by the expeller device 52 and introduced into the absorption column 6 at 56 through the cooler 53, pump 54 and conduit 55.

Furthermore, it is possible, in accordance with the invention, to insert a deep or low temperature cooling device 63 into each of the lines or conduits connecting the various pressure drop stages of the expansion stage or column 31 with the suction or inlet sides of the pumps 38, 39 and 40, such an arrangement being shown in broken lines and only diagrammatically in the suction line leading to the pump 38. The absorption medium separated from the mixture in these cooling devices 63 is then returned to the collector 50 through the conduit 64.

It will be readily seen from the foregoing that during the actual recovery procedure, which may be said to occur between the absorption column 6 and the last expansion stage 31, no external heat whatsoever is added to the system. In fact, in the entire production circuit, external heat is added only at the expeller device 52. A portion of this heat accompanies the expelled gases and impurities which are led away from the system, while the remainder of this added heat is disposed of in the cooler 53. At the pumps 38, 39 and 40, some heat is liberated due to the compressive action of these pumps, but again the so generated heat is removed from the system by the cooling devices 44, 45 and 46, respectively, and no external heat is required or added to the system under any circumstances. This enables the temperature level in the production circuit to be kept as low as possible, a factor which is of great importance in rendering the recovery process as economical as possible by enabling with a minimum expenditure of power a maximum recovery of the desired constituents, e.g. ethylene, ethane, etc., which are initially present in only very small concentrations in the coke oven gas.

To compensate for losses of absorption medium to be fed into the column 6 which occur during the practice of the process according to the invention, additional or fresh absorption medium is introduced from a suitable source thereof (not shown) into the collector vessel 50 through a conduit 65.

EXAMPLE

From a mass of 41,600 Nm.³/h. of coke oven gas mixture there are absorbed in the absorption column 6 at a pressure of 20 atm. and temperature of 5° C. 163 k. mol of the gas mixture. The charged absorption medium is expanded in the first expansion stage 13 to a pressure of 4 atm., in the second expansion stage 21 to a pressure of 1.2 atm., in the first pressure drop stage of the third expansion stage 31 to a pressure of 0.4 atm., and in a further pressure drop stage of this expansion stage to a pressure of 0.14 atm.

A portion of the expanded gas formed in the first expansion stage (56.6 k. mol) is returned to the crude or initial gas mixture in the container 2, the expanded gases of the second stage are conducted to the container 29 under the action of their own pressure gradient, and the expanded gases of the last pressure reducing stages are transferred to the container 29 by means of vacuum pumps 38 to 40. From the container 29 the gases are removed for subsequent fractionating procedures.

The quantity and composition of the crude or initial gas mixture, of the charge dor enriched absorption medium, of the expanded gases in the individual stages and of the ultimate gas mixture in the container 29 are collated in the following tables.

Table 1

| Substance | | Crude Gas Mixture | | Charged Absorption Medium | |
|---|---|---|---|---|---|
| | | 1,000,000 Nm.³/24 h. equiv. to 41,600 Nm.³/h. | | Benzene Circulation approx. 200 t./h. | |
| 1 | 2 | 3 | 4 | 5 | 6 | 7 |
| Name | Chem. Form. | Vol. Percent | Nm.³/h. | k. Mol/h. | k. Mol/h. | Percent |
| Hydrogen | H₂ | 55.00 | 22,880 | 1,026 | 6.2 | 0.3 |
| Carbon monoxide | CO | 7.00 | 2,920 | 133 | 2.0 | 0.1 |
| Carbon dioxide | CO₂ | 2.00 | 832 | 37 | 17.0 | 0.7 |
| Methane | CH₄ | 30.00 | 12,488 | 555 | 93.3 | 3.9 |
| Ethylene | C₂H₄ | 2.01 | 836 | 37 | 23.8 | 1.0 |
| Ethane | C₂H₆ | 0.85 | 334 | 15 | 12.8 | 0.5 |
| Propene | C₃H₆ | 0.20 | 84 | 4 | 3.7 | 0.1 |
| Propane | C₃H₈ | 0.06 | 25 | 1 | 1.2 | 0.1 |
| Benzene | C₆H₆ | 1.00 | 416 | 18 | 2,210.0 | 93.3 |
| Others | | 1.84 | 765 | 34 | | |
| Total | | 100.0 | 41,600 | 1,860 | 2,370.0 | 100.0 |
| Corresponding Value in Nm.³/h. | | | | 41,600 | 53,000 | |

Table 2

| Substance | | Expanded Gases | | | | | Gases For Fractionating | | |
|---|---|---|---|---|---|---|---|---|---|
| | | Into Crude Gas | To Be Fractionated | | | | | | |
| | | Expansion Stages | | | | | | | |
| | | 1 | 2 | 3 | 4 | | | | |
| 1 | 2 | 3 | 4 | 5 | 6 | 7 | 8 | 9 |
| Name | Chem. Form. | k. Mol/h. | k. Mol/h. | | | k. Mol/h. | k. Mol/h. | Nm.³/h. | Vol. Percent |
| Hydrogen | H₂ | 5.9 | 0.3 | | | | 0.3 | 6.5 | 0.3 |
| Carbon monoxide | CO | 1.83 | 0.2 | | | | 0.2 | 4.5 | 0.1 |
| Carbon dioxide | CO₂ | 3.9 | 6.8 | 3.6 | 1.9 | 12.3 | 275.0 | 11.5 |
| Methane | CH₄ | 39.19 | 39.7 | 12.1 | 2.7 | 54.5 | 1,220.0 | 51.4 |
| Ethylene | C₂H₄ | 3.5 | 7.8 | 6.2 | 4.0 | 18.0 | 403.0 | 16.9 |
| Ethane | C₂H₆ | 1.36 | 3.5 | 3.3 | 2.7 | 9.5 | 213.0 | 9.0 |
| Propene | C₃H₆ | 0.13 | 0.4 | 0.5 | 0.8 | 1.7 | 38.0 | 1.6 |
| Propane | C₃H₈ | 0.02 | 0.1 | 0.2 | 0.2 | 0.5 | 11.0 | 0.4 |
| Benzene | C₆H₆ | 0.77 | 2.2 | 3.1 | 4.0 | 9.3 | 208.0 | 8.8 |
| Others | | | | | | | | | |
| Total | | 56.6 | 61.0 | 29.0 | 16.3 | 106.3 | 2,381.0 | 100.0 |
| Corresponding Value in Nm.³/h. | | 1,269 | 1,366 | 650 | 365 | 2,381 | | |

Table 3

| Substance | | Proportion of Constituent Recovered |
|---|---|---|
| 1 | 2 | 3 |
| Name | Chem. Form. | Vol. Percent |
| Hydrogen | H₂ | 0.03 |
| Carbon monoxide | CO | 0.45 |
| Carbon dioxide | CO₂ | 33.0 |
| Methane | CH₄ | 9.8 |
| Ethylene | C₂H₄ | 48 |
| Ethane | C₂H₆ | 60 |
| Propene | C₃H₆ | 45 |
| Propane | C₃H₈ | 44 |
| Benzene | C₆H₆ | 50 |
| Others | | |

As may be seen from Tables 1 and 2, 2,370 k. mol of absorption medium are expanded in the first stage 13, 2,313.4 k. mol in the second stage 21, 2,252.4 k. mol in the first pressure drop stage of expansion stage 31, and finally 2,223.4 k. mol in the last pressure drop stage of the expansion stage 31, whereby there is collected at the bottom of the last stage 2,207.1 k. mol of regenerated absorption medium in liquid form for return to the column 6. This corresponds to a benzene circulation of approximately 200 t./h.

From column 3 of Table 3 it will be seen that the individual, most important and useful hydrocarbons present in the crude or initial gas mixture, namely $C_2H_4$, $C_2H_6$, $C_3H_6$ and $C_3H_8$, are recovered to the extent of 44 to 60% by means of the process according to the invention. Further it will also be seen that the amount of ballast gases H and CO contained in the ultimate gas product is very small and, for all practical purposes, negligible.

It is obvious that various changes may be made in the details of the process without departing from the spirit of this invention, and it is therefore to be understood that this invention is not to be limited to the specific details described.

Having thus described the invention, what is claimed as new and desired to be secured by Letters Patent is:

A process for recovering low boiling point hydrocarbons which are gaseous at normal temperatures from a coke oven gas containing only small concentrations of said hydrocarbons as well as undesired accompanying substances including hydrogen sulphide with relatively high vapor pressures; comprising the steps of taking a fluid absorption medium from a source thereof, then subjecting said fluid adsorption medium to a relatively high super-atmospheric pressure, bringing said absorption medium into contact with said coke oven gas to effect absorption of the desired constituent gaseous hydrocarbons of said coke oven gas by said medium, reducing to a first predetermined value the pressure on said medium and said gas absorbed thereby without adding any external heat thereto to effect partial liberation therefrom of a quantity of gases made up of a small concentration of said low boiling point hydrocarbons and of a predominant concentration of said undesired accompanying substances, returning a portion of said liberated quantity of gases to said coke oven gas, reducing the pressure on the remaining quantity of said absorption medium from said first value to a second predetermined value without adding any external heat to effect removal of some absorbed gases from said remaining quantity to form liberated gases, thereafter transferring said liberated gases including some of said hydrocarbons by virtue of their own inherent pressure gradients into a gas-receiving container, reducing the pressure of the remaining absorption medium to a third predetermined value without any addition of external heat to effect substantially complete separation of said desired constituent gaseous hydrocarbons from said absorption medium, cooling said desired constituent gaseous hydrocarbons, then pumping said latter into said container, the mass of gases collected in said container then being fractionally distilled to separate said mass into its pure constituent fractions, subjecting said remaining absorption medium again to said relatively high super-atmospheric pressure, returning said medium to said source for re-use with further coke oven gas, said contact between said absorption medium and said coke oven gas being brought about in an absorption column, diverting a part of said absorption medium from said first quantity thereof prior to the return of said medium to said source, purifying said diverted part of said absorption medium from said undesired accompanying substances including hydrogen sulphide, introducing said diverted part of said absorption medium in purified condition into said absorption column adjacent the upper part thereof, and introducing the remainder of said absorption medium directly from said source into said absorption column below the upper part thereof.

References Cited in the file of this patent

UNITED STATES PATENTS

| | | |
|---|---|---|
| 2,250,925 | Babcock | July 29, 1941 |
| 2,715,947 | Alexander | Aug. 23, 1955 |
| 2,719,601 | Bartholome et al. | Oct. 4, 1955 |
| 2,726,734 | Nirenberg | Dec. 13, 1955 |
| 2,781,862 | Fussman | Feb. 19, 1957 |